United States Patent
Sharma et al.

(10) Patent No.: US 11,277,784 B2
(45) Date of Patent: Mar. 15, 2022

(54) WIRELESS COMMUNICATIONS DEVICE AND METHOD

(71) Applicant: Sony Corporation, Tokyo (JP)

(72) Inventors: Vivek Sharma, Basingstoke (GB); Hideji Wakabayashi, Basingstoke (GB); Yuxin Wei, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/959,774

(22) PCT Filed: Jan. 3, 2019

(86) PCT No.: PCT/EP2019/050111
§ 371 (c)(1),
(2) Date: Jul. 2, 2020

(87) PCT Pub. No.: WO2019/137848
PCT Pub. Date: Jul. 18, 2019

(65) Prior Publication Data
US 2020/0367146 A1 Nov. 19, 2020

(30) Foreign Application Priority Data
Jan. 11, 2018 (EP) .................................... 18151305

(51) Int. Cl.
*H04W 40/00* (2009.01)
*H04W 48/10* (2009.01)
(Continued)

(52) U.S. Cl.
CPC .......... *H04W 48/10* (2013.01); *H04W 84/047* (2013.01); *H04W 88/085* (2013.01)

(58) Field of Classification Search
CPC . H04W 48/10; H04W 84/047; H04W 88/085; H04W 16/28; H04W 88/04
(Continued)

(56) References Cited

U.S. PATENT DOCUMENTS 8,843,241 B2 * 9/2014 Saberi ................... F16K 31/046
700/287
9,516,625 B2 * 12/2016 Zakrzewski ........ H04L 67/2842
(Continued)

FOREIGN PATENT DOCUMENTS

| WO | 2016/073984 A2 | 5/2016 |
| WO | 2016/188680 A1 | 12/2016 |
| WO | 2017/196246 A2 | 11/2017 |

OTHER PUBLICATIONS

International Search Report and Written Opinion dated Feb. 19, 2019 for PCT/EP2019/050111 filed on Jan. 3, 2019, 13 pages.
(Continued)

*Primary Examiner* — Amancio Gonzalez
(74) *Attorney, Agent, or Firm* — Xsensus LLP

(57) ABSTRACT

A wireless communications device is configured to act as a remote node of a wireless access network by selecting, when the wireless communications device is in an idle mode in which it has not established a connection to the wireless communications network, an infrastructure equipment forming part of the radio access network of the wireless communications network to provide a network interface with a core network part of the wireless communications network via the selected infrastructure equipment.

20 Claims, 6 Drawing Sheets

(51) Int. Cl.
*H04W 84/04* (2009.01)
*H04W 88/08* (2009.01)

(58) Field of Classification Search
USPC .......................................................... 455/449
See application file for complete search history.

(56) References Cited

U.S. PATENT DOCUMENTS

| | | | | |
|---|---|---|---|---|
| 10,117,223 | B1* | 10/2018 | Oroskar | H04W 68/02 |
| 10,129,928 | B2* | 11/2018 | Jia | H04L 1/1819 |
| 10,142,999 | B2* | 11/2018 | Panteleev | H04W 56/002 |
| 10,314,057 | B1* | 6/2019 | Oroskar | H04W 4/33 |
| 10,694,493 | B2* | 6/2020 | Yerramalli | H04W 52/0225 |
| 10,694,579 | B2* | 6/2020 | Tsuda | H04W 68/02 |
| 10,743,230 | B2* | 8/2020 | Martin | H04W 36/0027 |
| 10,764,825 | B2* | 9/2020 | Tsuda | H04W 76/20 |
| 10,904,933 | B2* | 1/2021 | Bangolae | H04W 88/04 |
| 10,917,918 | B2* | 2/2021 | Yerramalli | H04L 1/1822 |
| 11,057,937 | B2* | 7/2021 | Islam | H04B 7/269 |
| 11,102,754 | B2* | 8/2021 | Martin | H04W 76/14 |
| 2004/0063451 | A1* | 4/2004 | Bonta | H04W 88/04 455/519 |
| 2009/0029645 | A1 | 1/2009 | Leroudier | |
| 2015/0036528 | A1* | 2/2015 | Liu | H04W 40/26 370/252 |
| 2016/0337954 | A1* | 11/2016 | Gulati | H04W 76/14 |
| 2017/0230891 | A1 | 8/2017 | Fang | |
| 2018/0048986 | A1* | 2/2018 | Adachi | H04W 76/14 |
| 2018/0084478 | A1* | 3/2018 | Lee | H04W 40/12 |
| 2018/0092017 | A1* | 3/2018 | Freda | H04W 36/03 |
| 2018/0110001 | A1* | 4/2018 | Yasukawa | H04W 52/0219 |
| 2019/0372690 | A1* | 12/2019 | Singh | H04B 17/336 |
| 2020/0037218 | A1* | 1/2020 | Karampatsis | H04W 36/0058 |
| 2020/0059292 | A1* | 2/2020 | Kim | H04B 7/15 |

OTHER PUBLICATIONS

3GPP, "Report of 3GPP TSG RAN meeting #75, Dubrovnik, Croatia, Mar. 6-9, 2017," ETSI MCC, 3GPP TSG RAN Meeting No. 76, RP-171409, West Palm Beach, USA, Jun. 5-8, 2017, pp. 1-189.

* cited by examiner

WIRELESS COMMUNICATIONS DEVICE AND METHOD

CROSS-REFERENCE TO RELATED APPLICATIONS

The present application is based on PCT filing PCT/EP2019/050111, filed Jan. 3, 2019, which claims priority to EP 18151305.2, filed Jan. 11, 2018, the entire contents of each are incorporated herein by reference.

BACKGROUND

Field of Disclosure

The present disclosure relates to wireless communications devices which are configured to act as remote nodes to form cells of a radio network part of a wireless communications network and methods of the same.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy such networks is therefore strong and the coverage area of these networks, i.e. geographic locations where access to the networks is possible, may be expected to increase ever more rapidly.

With the development of 5G network architectures new challenges are presented. In some examples the deployment of remote nodes which form cells of a wireless communications network can present a technical problem where a connection to a core network part of a wireless communications network is required. If the connection is provided using a wireless access interface which is provided by the radio network then new technical problems to be solved can be created.

SUMMARY OF THE DISCLOSURE

The present disclosure can help address or mitigate at least some of the issues discussed above.

Embodiments of the present technique can provide a wireless communications device configured to act as a remote node of a wireless access network by selecting, when the wireless communications device is in an idle mode in which it has not established a connection to the wireless communications network, an infrastructure equipment forming part of the radio access network of the wireless communications network to provide a network interface with a core network part of the wireless communications network via the selected infrastructure equipment. The wireless communications device then controls transmitter circuitry to transmit radio signals via a network interface reverse channel to the selected infrastructure equipment, the radio signals representing uplink data received from one or more communications devices for transmission to the core network when the wireless communications device is operating as the remote node, and controls receiver circuitry to receive radio signals via a network interface forward channel from the selected infrastructure equipment, the radio signals representing downlink data for transmission to one or more communications devices received from the core network part of the wireless communications network when the wireless communications device is operating as the remote node.

Embodiments of the present technique can provide a wireless communications device which is configured to select an infrastructure equipment of a radio network part of a wireless communications network to provide a wireless network interface to connect the wireless communications device to a core network part of the wireless communications network, so that the wireless communications device can act as a remote node forming a cell of the radio access network and the selected infrastructure equipment acts as a relay node. The wireless communications device is configured in an idle mode in which it has not yet established a connection with the wireless communications network for transmitting and receiving data to select the infrastructure equipment from a plurality of infrastructure equipment. The selection can be based on system information received so that the wireless communications device differs from a conventional operation of a communications device operating with the wireless communications network. The wireless communications device can therefore provide a remote node to the network.

Embodiments of the present technique can provide an arrangement in which a wireless communications device acting as a base station or remote radio access node (remote node) and which is configured to use wireless network interface as a backhaul link to the core network via a base station or radio access node acting as a relay node from the radio access node receives broadcast information such a public warning system (PWS) information or other services related information from the core network via the wireless network interface from the relay node and not when transmitted from the relay node when in connected mode.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Long Term Advanced Radio Access Technology (4G)

Figure 1:
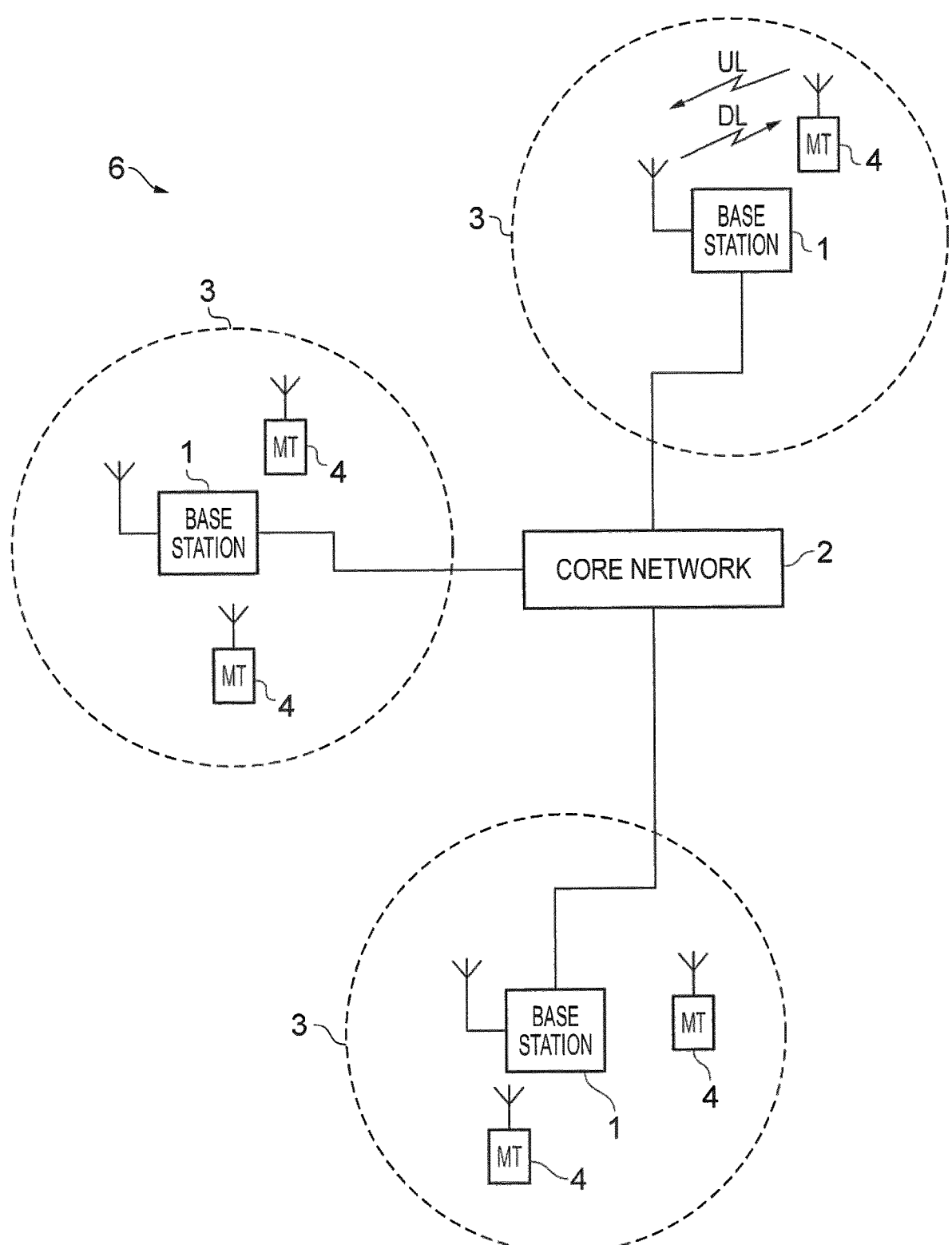
FIG. 1 schematically represents some aspects of a LTE-type wireless telecommunication system which may be configured to operate in accordance with certain embodiments of the present disclosure.

FIG. 1 provides a schematic diagram illustrating some basic functionality of a mobile telecommunications network/system 6 operating generally in accordance with LTE principles, but which may also support other radio access technologies, and which may be adapted to implement embodiments of the disclosure as described herein. Various elements of FIG. 1 and certain aspects of their respective modes of operation are well-known and defined in the relevant standards administered by the 3GPP® body, and also described in many books on the subject, for example, Holma H. and Toskala A [5]. It will be appreciated that operational aspects of the telecommunications networks discussed herein which are not specifically described (for example in relation to specific communication protocols and physical channels for communicating between different elements) may be implemented in accordance with any known techniques, for example according to the relevant standards and known proposed modifications and additions to the relevant standards.

The network 6 includes a plurality of base stations 1 connected to a core network 2. Each base station provides a coverage area 3 (i.e. a cell) within which data can be communicated to and from communications devices 4. Data is transmitted from base stations 1 to communications devices 4 within their respective coverage areas 3 via a radio downlink. Data is transmitted from communications devices 4 to the base stations 1 via a radio uplink. The core network 2 routes data to and from the communications devices 4 via the respective base stations 1 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations, nodeBs, e-nodeBs, eNB, g-nodeBs, gNB and so forth. In this regard different terminology is often associated with different generations of wireless telecommunications systems for elements providing broadly comparable functionality. However, certain embodiments of the disclosure may be equally implemented in different generations of wireless telecommunications systems, and for simplicity certain terminology may be used regardless of the underlying network architecture. That is to say, the use of a specific term in relation to certain example implementations is not intended to indicate these implementations are limited to a certain generation of network that may be most associated with that particular terminology.

New Radio Access Technology (5G)

Figure 2:
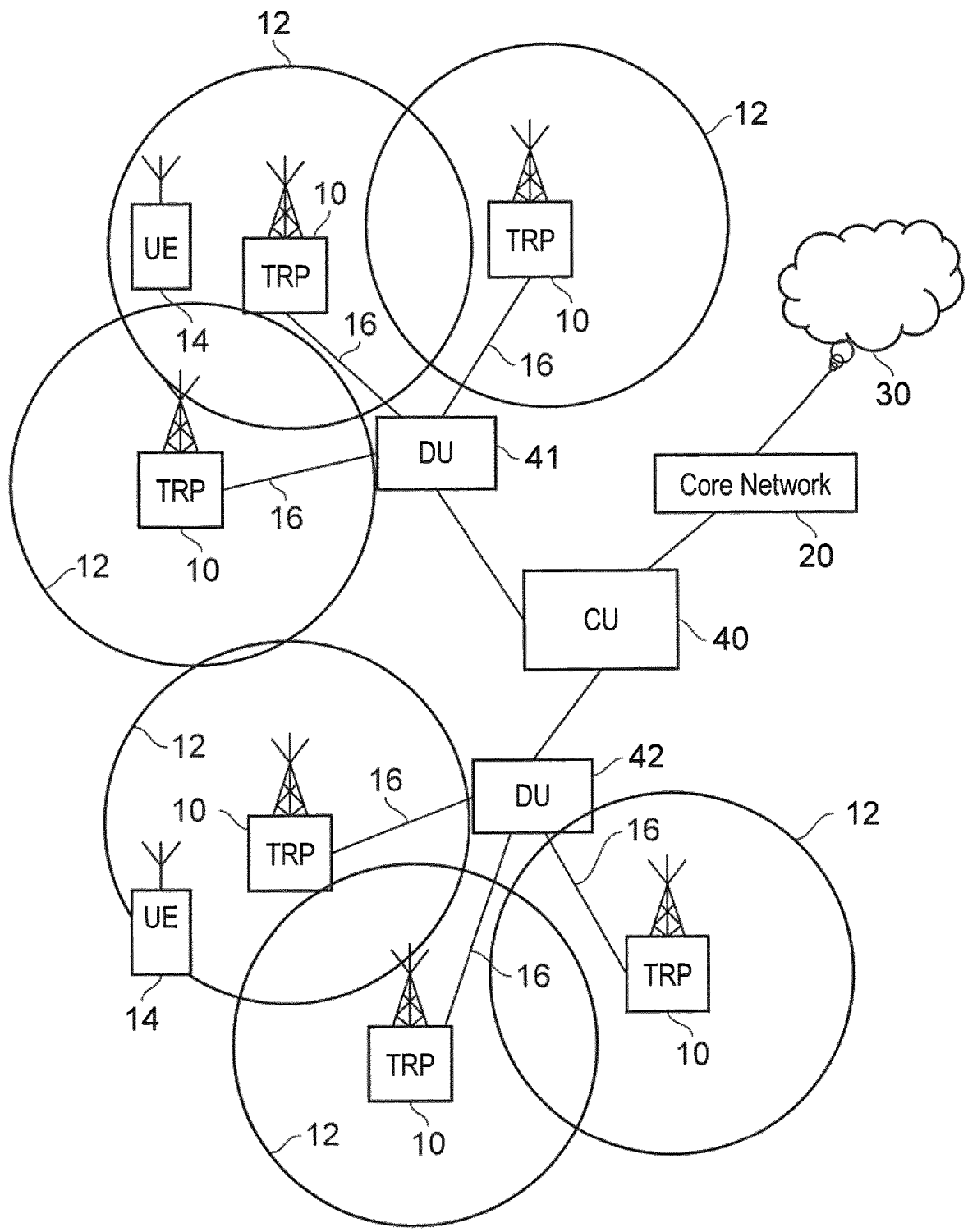
FIG. 2 schematically represents some aspects of a new radio access technology (RAT) wireless communications system which may be configured to operate in accordance with certain embodiments of the present disclosure.

An example configuration of a wireless communications network which uses some of the terminology proposed for NR and 5G is shown in FIG. 2. A 3GPP Study Item (SI) on New Radio Access Technology (NR) has been defined [2]. In FIG. 2 a plurality of transmission and reception points (TRPs) 10 are connected to distributed control units (DUs) 41, 42 by a connection interface represented as a line 16. Each of the TRPs 10 is arranged to transmit and receive signals via a wireless access interface within a radio frequency bandwidth available to the wireless communications network. Thus within a range for performing radio communications via the wireless access interface, each of the TRPs 10, forms a cell of the wireless communications network as represented by a dashed line 12. As such wireless communications devices 14 which are within a radio communications range provided by the cells 10 can transmit and receive signals to and from the TRPs 10 via the wireless access interface. Each of the distributed control units 41, 42 are connected to a central unit (CU) 40 via an interface. The central unit 40 is then connected to the a core network 20 which may contain all other functions required to transmit data for communicating to and from the wireless communications devices and the core network 20 may be connected to other networks 30.

The elements of the wireless access network shown in FIG. 2 may operate in a similar way to corresponding elements of an LTE network as described with regard to the example of FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 10 of FIG. 2 may in part have a corresponding functionality to a base station or eNodeB of an LTE network. Similarly the communications devices 14 may have a functionality corresponding to UE devices known for operation with an LTE network. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and communications devices of a new RAT network will be functionally similar to, respectively, the core network component, base stations and communications devices of an LTE wireless communications network.

In terms of broad top-level functionality, the core network 30 of the new RAT telecommunications system represented in FIG. 2 may be broadly considered to correspond with the core network 2 represented in FIG. 1, and the respective controlling nodes 40 and their associated distributed units/ TRPs 10 may be broadly considered to provide functionality corresponding to base stations of FIG. 1. The term network infrastructure equipment/access node may be used to encompass these elements and more conventional base station type elements of wireless telecommunications systems. Depending on the application at hand the responsibility for scheduling transmissions which are scheduled on the radio interface between the respective distributed units and the communications devices may lie with the controlling node/centralised unit and/or the distributed units/TRPs. A communications device 14 is represented in FIG. 2 within the coverage area of the first communication cell 12. This communications device 14 may thus exchange signalling with the first controlling node 40 in the first communication cell 212 via one of the distributed units 10 associated with the first communication cell 12.

It will further be appreciated that FIG. 2 represents merely one example of a proposed architecture for a new RAT telecommunications system in which approaches in accordance with the principles described herein may be adopted, and the functionality disclosed herein may also be applied in respect of wireless telecommunications systems having different architectures.

Thus certain embodiments of the disclosure as discussed herein may be implemented in wireless telecommunication systems/networks according to various different architectures, such as the example architectures shown in FIGS. 1 and 2. It will thus be appreciated the specific wireless telecommunications architecture in any given implementation is not of primary significance to the principles described herein. In this regard, certain embodiments of the disclosure may be described generally in the context of communications between network infrastructure equipment/access nodes and a communications device, wherein the specific nature of the network infrastructure equipment/access node and the communications device will depend on the network infrastructure for the implementation at hand. For example, in some scenarios the network infrastructure equipment/ access node may comprise a base station, such as an LTE-type base station 11 as shown in FIG. 1 which is adapted to provide functionality in accordance with the principles described herein, and in other examples the network infrastructure equipment may comprise a control unit/ controlling node 40 and/or a TRP 10 of the kind shown in FIG. 2 which is adapted to provide functionality in accordance with the principles described herein.

As is well understood, various wireless telecommunications networks, such as the LTE-based network represented in FIG. 1 and the NR-based network represented in FIG. 2, may support different Radio Resource Control (RRC) modes for UEs, typically including: (i) RRC idle mode (RRC_IDLE); and (ii) RRC connected mode (RRC_CONNECTED). When a UE transmits data, RRC connected mode is generally used. The RRC idle mode, on the other hand, is for UEs which are registered to the network (EMM-REGISTERED), but not currently in active communication (ECM-IDLE). Thus, generally speaking, in RRC connected mode a UE is connected to a radio network access node (e.g. an LTE base station) in the sense of being able to exchange user plane data with the radio network access node. Conversely, in RRC idle mode a UE is not connected to a radio network access node in the sense of not being able to communicate user plane data using the radio network access node. In idle mode the UE may still receive some communications from base stations, for example reference signalling for cell reselection purposes and other broadcast signalling. The RRC connection setup procedure of going from RRC idle mode to RRC connected mode may be referred to as connecting to a cell/base station.

For a UE in RRC idle mode the core network is aware that the UE is present within the network, but the radio access network (RAN) part (comprising radio network infrastructure equipment such as the base stations 1 of FIG. 1 and/or the combined TRPs/CUs 10, 40, 42 of FIG. 2) is not. The core network is aware of the location of idle mode UEs at a paging tracking area level but not at the level of individual transceiver entities. The core network will generally assume a UE is located within the tracking area(s) associated with a transceiver entity most recently used for communicating with the UE, unless the UE has since provided a specific tracking area update (TAU) to the network. (As is conventional, idle mode UEs are typically required to send a TAU when they detect they have entered a different tracking area to allow the core network to keep track of their location.) Because the core network tracks UEs at a tracking area level, it is generally not possible for the network infrastructure to know which specific transceiver entities (radio network node) to use when seeking to initiate contact with a UE in idle mode. Consequently, and as is well known, when a core network is required to connect to an idle mode UE a paging procedure is used.

Embodiments of the present technique can provide an arrangement in which a wireless communications device, such as for example a UE, operates as a base station or TRP in accordance with a 5G architecture in which it does not have a physical connection to other infrastructure equipment (DU or CU) forming part of a radio access network to a core network of the wireless communications network, such as a DU 10. Instead of having a physical interface between the communications device acting as a TRP and the DU 42, another TRP 10 operates to provide a wireless communications channel for both forward traffic from the core network to the communications device acting as a TRP and a backward channel from the communications device acting as a TRP for the core network. The communications device acting as a TRP to form a cell of the wireless communications network which connects to an infrastructure equipment of the wireless communications network (DU) via another TRP will be referred to as a remote node, whereas the TRP providing the wireless connection to the wireless communications network may be referred to as a relay node.

Example embodiments provide an arrangement in which the remote node is a network node which acts like a UE when in Idle mode.

The wireless network interface/connection is provide by wireless communications forward channel and backward channel which may use the same wireless access interface as the UEs (in-band) or may use a different wireless communications interface on different radio frequencies (out of band). The forward channel and the backward channel therefore perform a wireless network interface referred to colloquially as a 'backhaul' connection. If both relay node and the remote node are operating on the same frequency then one node can either transmit or receive but may not perform both actions at the same time.

Figure 3:
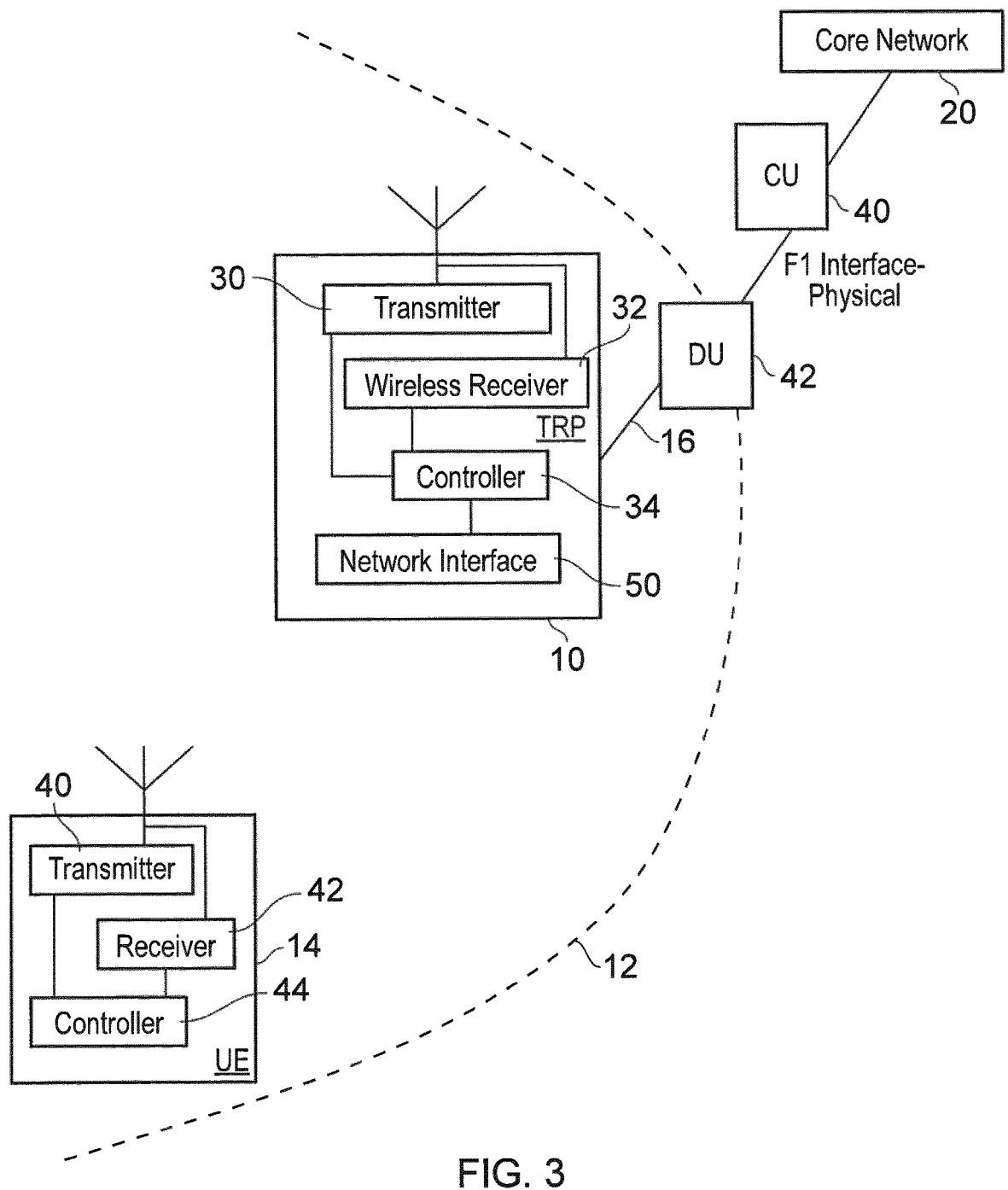
FIG. 3 is a schematic block diagram of some components of the wireless communications system shown in FIG. 2 in more detail in order to illustrate example embodiments of the present technique.

A more detailed diagram of some of the components of the network shown in FIG. 2 is provided by FIG. 3. In FIG. 3 a TRP 10 as shown in FIG. 2 comprises, as a simplified representation, a wireless transmitter 30, a wireless receiver 32 and a controller or controlling processor 34 which may operate to control the transmitter 30 and the wireless receiver 32 to transmit and receive radio signals to one or more UEs 14 within a cell 12 formed by the TRP 10. As shown in FIG. 3, an example UE 14 is shown to include a corresponding transmitter 40, a receiver 42 and a controller 44 which is configured to control the transmitter and receiver to transmit signals representing uplink data to the wireless communications network via the wireless access interface formed by the TRP 10 and to receive downlink data as signals transmitted by the transmitter 30 and receiver 42 in accordance with the conventional operation. The transmitters 30, 40, the receivers 32, 42 may include radio frequency filters and amplifiers as well as signal processing components and devices in order to transmit and receive radio signals in accordance for example with the 5G standard.

As shown in FIG. 3 the TRP 10 also includes a network interface 50 which connects to the DU 42 via a physical interface 16. The network interface therefore provides a communication of data and signalling traffic from the TRP 10 via the DU 42 and the CU 40 to the core network 20. The interface between the DU 42 and the CU 40 is known as the F1 interface which can be a physical or a logical interface. The F1 interface between CU and DU is specified in 3GPP TS 38.470, 38.473. In one example the connection from the TRP to the DU is via fibre optic. The connection to the core network can be generally referred to as a backhaul including the interface 16 from the network interface 50, the TRP 10 to the DU 42.

In accordance with some example embodiments, the interface or connection of the network between a communications device acting as a TRP to form a cell (remote node) is formed by a wireless connection to another TRP 10 acting as a relay node. Such an example embodiment is shown in FIG. 4.

Figure 4:
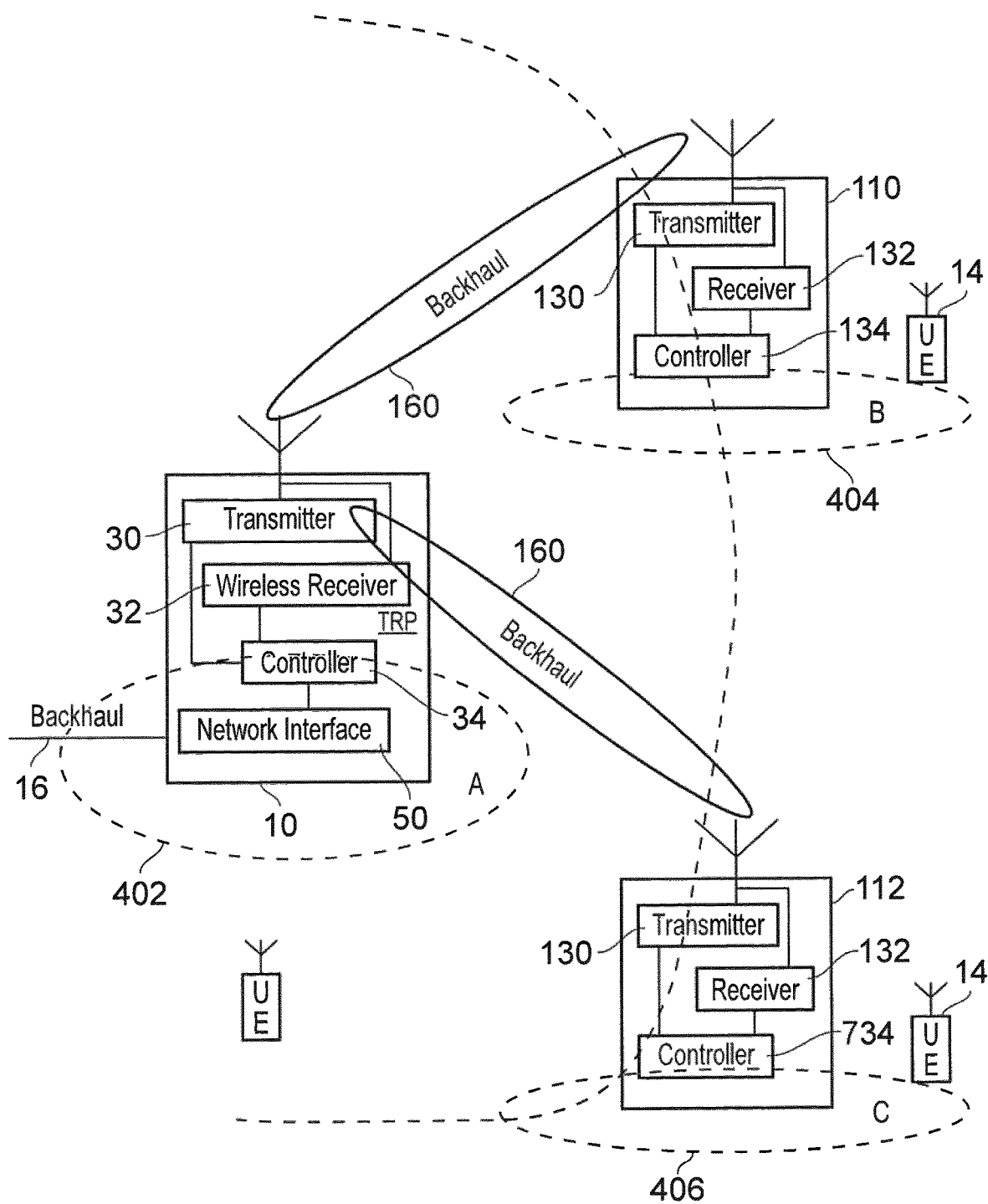
FIG. 4 is a schematic block diagram illustrating an arrangement in which two wireless communications devices form remote node TRPs of a radio network part of a wireless communications network by receiving a wireless network interface with a TRP acting as a relay node to provide a backhaul connection to a core network.

As shown in FIG. 4, a first TRP 10 is connected to a DU 42 by a physical interface 16 using a network interface 50. The first TRP 10 therefore forms a first cell A 402 in a conventional manner by transmitting and receiving signals via a wireless access interface provided by the radio network part of a wireless communications network. However as shown in FIG. 4, two other communications devices are configured to act as TRPs 110, 112 to form to other cells B and C 404, 406. The first TRP 10 is therefore acting as a relay node to the second and third TRPs 110, 112 which act as remote nodes.

As shown in FIG. 4, the second TRP 110 is a wireless communications device shown to comprise a transmitter 130, a receiver 132 and a controller 134. Correspondingly, the second TRP 112 is a wireless communications device comprising a transmitter 130, a receiver 132, and a controller 134. The second TRP 110 acts as a remote node to form the cell 404 B and the third TRP 112 acts as a remote node to form the cell 406 C. The UEs 14 operating within these cells 404, 406 transmit and receive radio signals via the wireless access interface provided by the radio network part of the wireless communication in the same way as a UE 14 would transmit and receive radio signals via the wireless access interface provided by the TRP 10 from cell 402 A.

According to example embodiments of the present technique the wireless communications devices forming the TRPs 110, 112 do not include a network interface 50 but form a connection to the DU 42 of the wireless communications network via the first TRP 10 of the cell 402 A by configuring a wireless communications forward channel and a wireless communications reverse channel to and from the first TRP 10 to form a backhaul connection interface 160. The backhaul connection 160 is therefore a wireless network interface to the first TRP 10 and the physical backhaul interface 16 to the DU 42. According to this arrangement therefore the second and third TRPs 110, 112 formed by the wireless communications devices are remote nodes of the wireless communications network and form part of the radio access network. The first TRP 10 therefore acts as a donor or a relay node, sometimes referred to as a donor eNode-b in 4G or other 3GPP standards.

Example embodiments of the present technique can effect two aspects in which wireless communications devices acting as remote nodes forming TRPs 110, 112 are configured differently to a conventional wireless communications device or UE 14. In one example the communications device acting as a remote node or TRP 110 may receive information from the relay node (TRP 10) via both the backhaul wireless interface connection 160 and also a conventional wireless access interface which is transmitted to all UEs 14 for example within the same cell 404. The wireless communications device acting as a remote node (TRP 110) therefore is configured differently to a conventional UE 14 in respect of how the TRP 110 either uses the information or selects the information for transmission to UEs 40 served by a cell 404 formed by that remote node (TRP 110). This is because the same information/configuration received via system information from the relay node in cell A 402 and received at cells B and/or cell C 404, 406 will be received over F1 interface as well when remote node is in connected mode. There may also be some differences when the wireless communications device 110 acting as a remote node is operating in idle mode. A second aspect is how the TRP 110 selects one of the other TRPs 10 to act as a relay node or relay TRP 10. This aspect is explained with reference to FIG. 5.

Figure 5:
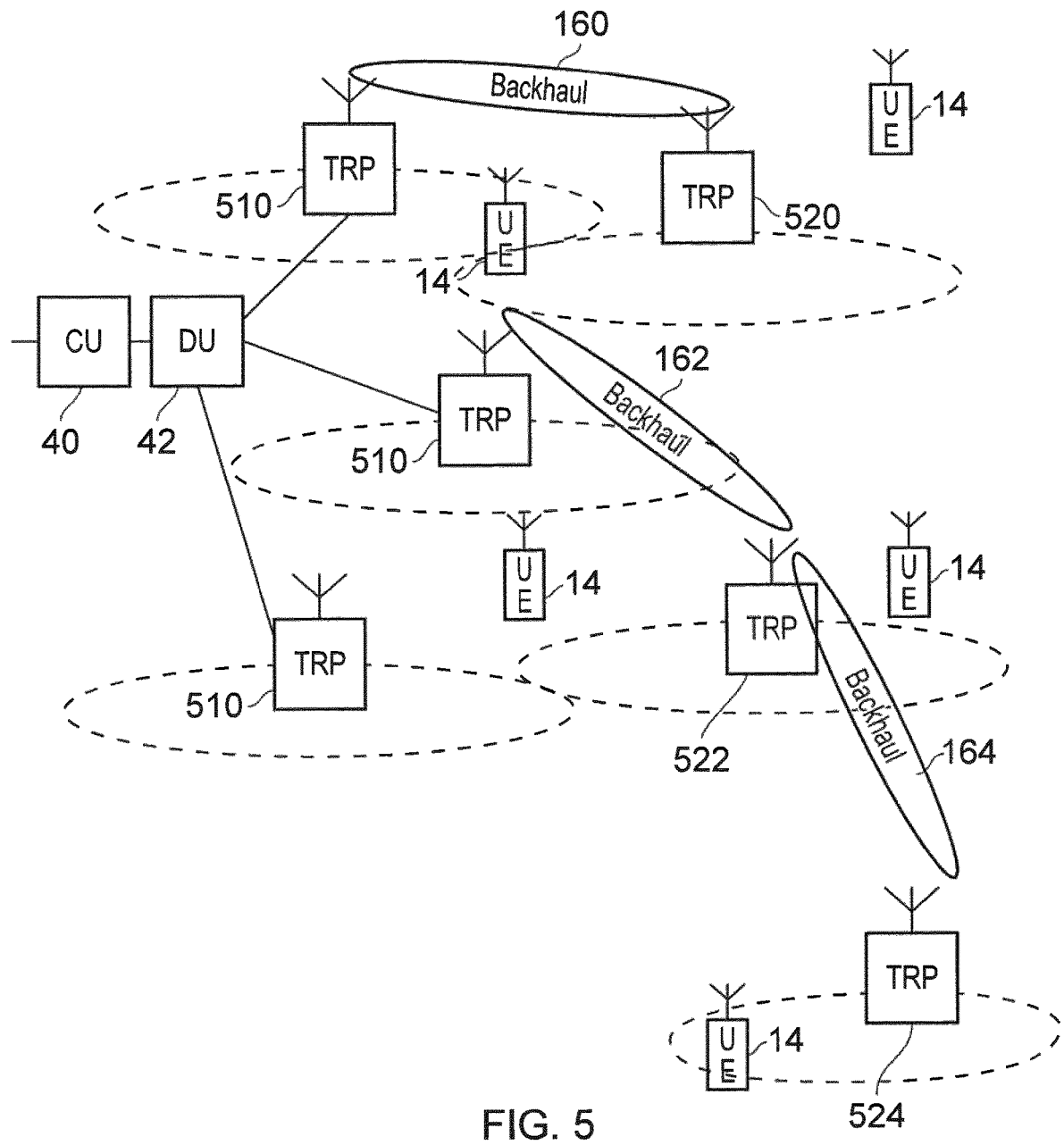
FIG. 5 is a schematic block diagram illustrating an arrangement in which wireless communications devices act as remote node TRPs of a radio network part of a wireless communications network by selecting one of a plurality of TRPs to act as a relay node from which that remote node receives a wireless network interface forming part of a backhaul connection to a core network part of a wireless communications network.

As shown in FIG. 5, which corresponds to the example embodiment shown in FIG. 4, TRPs 510 are shown to be connected to a DU 42 which is then connected to the CU 40 as with a conventional arrangement as shown in FIGS. 2 and 3. The UEs 14 therefore transmit and receive radio signals representing data on the uplink and the downlink as for conventional operation via the conventional TRPs 510. However, as shown in FIG. 5 three other TRPs 520, 522, 524 are formed by wireless communications devices acting as remote nodes forming the TRPs 520, 522, 524 and therefore have established wireless network interface or backhaul 160, 162, 164 via two of the TRPs 510 to the DU 42 as explained with reference to FIG. 4. However, as shown in FIG. 5, for example, a remote node TRP 520 could have established the wireless network interface via any one of the other TRPs 510 having a physical network interface 16 to the core network. According to the present technique therefore, the first remote node TRP 520 as with the second remote node TRP 522 performs a selection process to identify which of the plurality of other TRPs 510 is selected in order to establish wireless forward and reverse channels of the network interface to establish the backhaul connections 160, 162.

According to one example embodiment, each of the TRPs 510 transmits an indication as to whether or not it can act as a relay node for another TRP 520, 522. If the TRP does not transmit an indication that it can act as a relay node then the wireless communications device acting as a remote node TRP 520, 522 ignores any of the plurality of TRPs 510 which cannot act as a relay node when selecting the TRP 510 to be its relay node.

In another example each of the other TRP's 510 may transmit an access class or an indication of access classes which are barred (access class barring). If an access class indicates that a TRP cannot act as a relay node for wireless communications device acting as a remote node TRP 520, 522 then this TRP is ignored by the communications device.

As shown in FIG. 5, a third wireless communications devices acting as a remote node TRP 524 is provided with a wireless network interface or backhaul 164 via the second communications device acting as a remote node TRP 522 which itself receives a wireless network interface via the backhaul interface 162 to a TRP 510. In accordance with this example embodiment, the TRPs 510 may transmit an indication as to whether or not they allow a connection to a wireless communications device which is acting as a relay node to another wireless communications device acting as a TRP. This is a so-called "hop", that is core network signaling and user data is transmitted and received via more than one TRP acting as a relay node. Accordingly, the third TRP 524 may receive via the secondary wireless communications device 522 from the primary TRP 510 an indication that it can act as a relay node through another relay node and an indication of a number of hops which can be supported. Accordingly, the third remote node TRP 524 only selects TRPs which can support a multi-hop interface.

According to the embodiments presented in FIG. 5 remote nodes 520, 522, 524 may be in IDLE mode once they power on and will perform a synchronisation procedure and read any necessary system information transmitted from the relay node TRP 510. The relay node TRP 510 therefore are configured to support relaying operations and indicate support of relaying system information. The remote nodes read a mast information block (MIB) as well as system information blocks, SIB1 and SIB2. For 5G new radio, these SIBs may have a similar structure to LTE MIB, SIB1, SIB2. According to the example embodiments presented in the above paragraphs, the remote nodes read the system information in order to check if the candidate cell supports:

A relaying operation; A relay node must broadcast an indication as part of system information (MIB or SIBs) that it supports a relaying operation or connection to the wireless communications network for a remote node. The remote node will read this new indication and then decide if the cell is suitable for the remote node to camp on to. This indication can be implicit e.g. based on reserved cell IDs for use or another means of signalling at L1 and not necessarily part of system information A normal UE will ignore this field. Not all cells in the network are required to support backhaul access due to implementation effort e.g. ensuring end to end latency of backhaul link, availability, error rate etc.

A multihop operation and a number of hops: A relay node will broadcast an indication stating the number of hops supported by it. A remote node trying to camp on the cell will take this indication into account. A normal UE will ignore this field. In addition, a remote node may be configured to support a number of hops and will select a cell which supports a number of hops which can support its connection via this relay node and one or more other remote nodes within the maximum number.

A cell is barred; if this existing bit is set in the system information from the relay node then remote node shall treat the cell as barred. This is the same behaviour as a normal UE i.e. the remote node treats the cell as barred and considers other cells on the same frequency if an IFRI bit is set.

If access barring is enabled, then the remote node may have the highest priority access class. This access class must be higher than normal UE because if remote node is barred due to access then it will result in service interruption. In extreme cases, access barring may be skipped for remote node access.

A remote node may access the relay node cell if it is "reserved for operator use". A normal UE does not access a cell which is reserved for operator use and only a special class UEs (e.g. operator employees) are allowed to access the cell.

A Band Width Part (BWP) in IDLE mode is reserved for a remote node to camp on to. The BWP was introduced in 3GPP Release-15 for 5G new radio (NR) whereby a control channel is limited to the bandwidth part, which can result in a reduced power consumption of a UE supporting a bandwidth of a BWP and less than the bandwidth of a cell. The BWP for a remote node camping in Idle mode can be used to create an isolated resource for the remote node. The BWP in idle mode from a relay node can help expedite RACH resources for remote nodes and/or broadcast a specific set of system information from the relay node which are meant only for remote nodes. If such BWP for idle remote nodes is configured and broadcast from a relay node then a remote node must camp on to this configured BWP only.

According to some example embodiments a remote node may not read SIBs related to cell reselection and other service related SIBs, which may not have any relevance to a communications device acting as a remote node. Such information may be provided in dedicated signalling as a remote node may have exceptional priority. A remote node will then move to a connected mode in order to receive the dedicated signalling. However, a remote node can behave like a UE when in IDLE mode. This implies that the remote node will support some services such as on-demand SI methods when in Idle mode. As will be appreciated, according to the example embodiments described above, a UE forming a remote node selects another TRP to act as a relay node, when the UE is an Idle mode in which it does not have an active connection to the wireless communications network.

As indicated above, according to some example embodiments, a communications device which acts as a remote node TRP can behave differently in respect of the detection of information which may be transmitted different from the core network for different applications such as signalling or broadcast information for UEs within a cell formed by the wireless communications device. Such an example is shown in FIG. 6.

Figure 6:
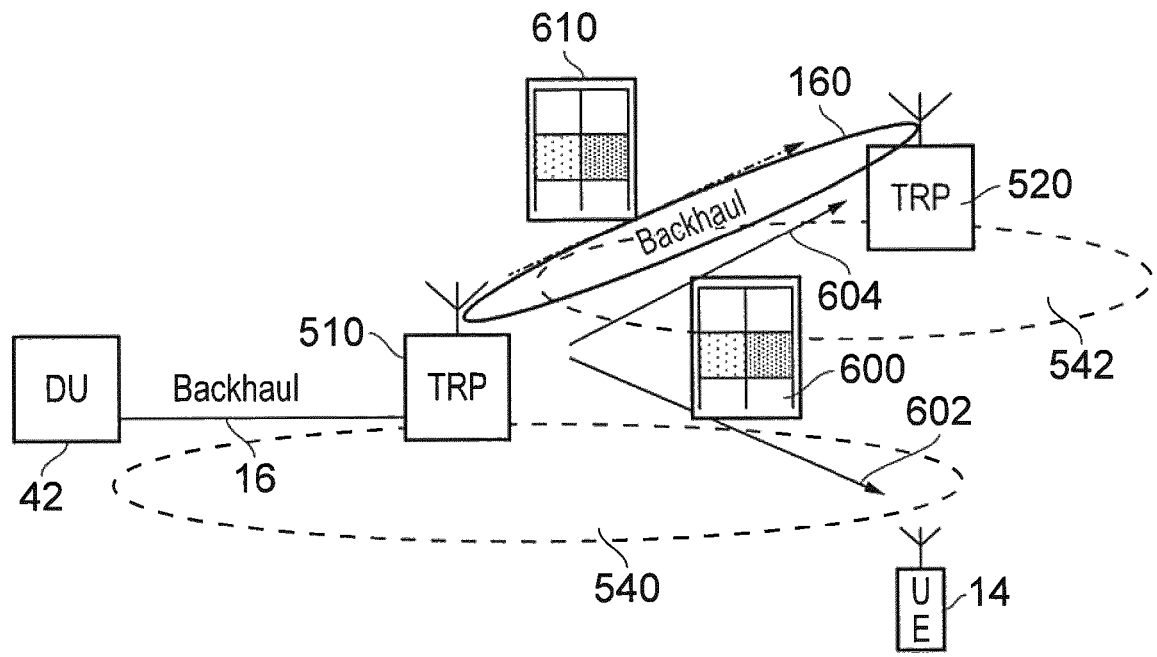
FIG. 6 is a schematic block diagram illustrating an arrangement in which a wireless communications device acts as remote node TRPs of a radio network part of a wireless communications network and receives broadcast information via a wireless access interface from a relay node and via a wireless network interface forming part of a backhaul connection to a core network part of a wireless communications network and selects in preference the broadcast information received via the wireless network interface.

As shown in FIG. 6, one of the TRPs 510 shown in FIG. 5 is shown with the DU 40 connected via a physical interface 16 to form the backhaul to the core network. Also shown in FIG. 6 is a wireless network interface 160 formed from a wireless forward and a reverse channel provided by the TRP 510 to one of the wireless communications devices acting as a TRP 520. The first TRP 510 therefore forms a first cell 540 and the second TRP 520 forms a second cell 542.

As for a conventional operation the TRP 510 receives system information, which is locally configured via an OAM function or received from the core network from the physical backhaul interface 16 via the DU 40. The system information therefore must be transmitted periodically to UEs 14 operating within the first cell 540. As shown in FIG. 6, this system information is represented by a box 600. However, because the first TRP 510 is configured in accordance with a conventional arrangement, the TRP 510 transmits this system information 600 to all UEs 14 within this first cell 540 but this is also received by the wireless communications device acting as a remote node TRP 520 as shown by arrows 602, 604. Furthermore, because the system information is for transmission to all UEs 14 from each of the TRPs forming the radio network interface, the system information 600 will also be received via the wireless network interface 160 at the wireless communications device acting as the remote node TRP 520 for transmission to UEs 14 within the second cell 542. Accordingly, the second TRP 520 receives another version of the system information 610 via the wireless network interface from the forward channel from the relay node TRP 510. According to this example embodiment therefore, the wireless communications device acting as a TRP 520 ignores the version of the system information 600 it received from the conventional wireless access interface broadcast within the first cell 540 and only acts upon the second version of the system information 610 it received via the wireless network interface 160.

In other examples, broadcast information may be received via the conventional wireless access interface from the relay node TRP 510 but also received via the wireless network interface 160 from the relay node TRP 510. The wireless communications device acting as a remote node TRP 520 therefore selects the version of the broadcast information received via the wireless network interface 160 for transmission to UEs 14 within the second cell 542. Examples of this broadcast information may be public warning system information (PWS) or early warning or Earthquake and Tsunami Warning System information (ETWS). This broadcast information may also include MBMS data. The PWS, ETWS, MBMS and other service related information may not be broadcasted by the relay node TRP 510 at a time when the remote node powers on or when the remote node was in the IDLE mode, because the warning and MBMS service or other services may be transmitted later.

For the PWS including ETWS, the DU 42 may start broadcasting the warning information as soon as it received the warning information from the CU 40. According to the example embodiment explained above, the remote node TRP 520 will receive the warning information from CU to DUs at remote node 520 which can also be received from both backhaul link. In this case, the remote node TRP 520 ignores the system information received over the air (SIBs) and takes the information received via the F1 interface or information received via any similar interface into account. The rationale behind this approach is that some PWS warning messages like ETWS primary notification have strict delay requirements i.e. end to end delay of 4 seconds. As such the relay node may prioritize backhaul transmissions over its own SIBs transmission so that the delay budget or latency requirements can be met. If relay node does not prioritize or provide exceptional treatment while scheduling backhaul for remote nodes then the end to end latency target may not be met.

Embodiments can also provide an advantage because the integrity of PWS or other services related information may be compromised over the air (SIBs) as SIBs are not encrypted or SIBs may be broadcasted by a rogue base station. However, F1 interface between CU and DU may have to fulfill the security requirements and AS level of security will always be active between a relay node and remote node over the wireless network interface, once the remote node is in RRC_Connected mode.

Another option to achieve the same results is whereby a relay node configures a bandwidth part (BWP) for a remote node in RRC_connected mode and the remote node communicates in that configured bandwidth part only. System information for normal UEs is never scheduled in that bandwidth part. With this approach, all architectures mentioned are applicable even if a relay node and a remote node use the same cell ID.

According to another embodiment, a receiver receiving system information from a relay node will never trigger an on-demand SI request in RRC_Connected mode. In other words, F1 interface specifications must ensure that the same information as on-demand SI request in connected mode is available. This is due to factors like latency and security as mentioned above.

The above examples include a single hop and single connectivity. However, proposals are equally applicable to multi hop and redundancy. A remote node may receive system information of one or more cells in parallel (multiple tx/rx) and the F1 interface information/configuration also relayed from one or more than one cells. In this case, selection between different links of F1 interface information/configuration should be for the remote node to decide when in connected mode.

Figure 7:
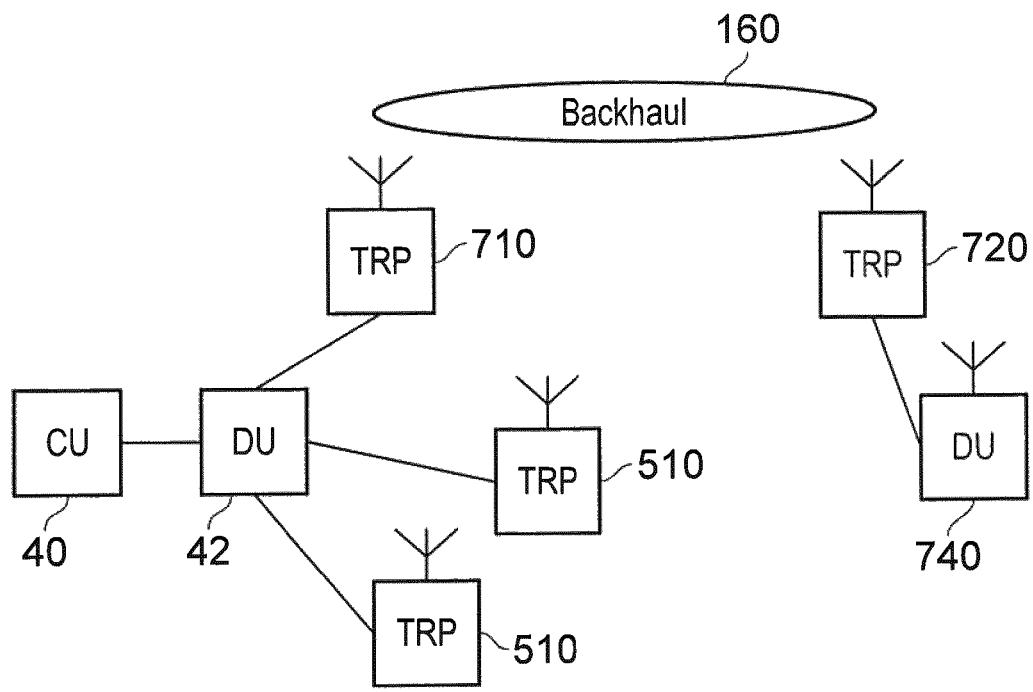
FIG. 7 is a schematic block diagram of a further example network architecture in which a wireless communications device forms a remote node of a radio network.

As explained, the example embodiments described above provide an arrangement in which a wireless communications device (UE) acts as a TRP to form a remote node of a wireless communications network by selecting another TRP, when in an idle mode, to provide a wireless network interface (backhaul) to core network components of the network. However other configurations and architectures are equally applicable. FIG. 7 provides an alternative architecture based on the example embodiment of FIG. 6. As shown in FIG. 7, one of the TRPs 710 from a plurality of TRPs 510, 710 has been selected by a communications device acting as a relay node 720. However as shown in FIG. 7 the remote node includes a DU 740 and so in combination the TRP 720 and the DU 740 form a cell 750. The wireless communications device (UE) may in some example perform the functionality of the TRP 720 and is connected separately to the DU 740 or the wireless communications device forms the functionality of the TRP 720 and the DU 740. For both examples the wireless network interface through the TRP 710 acting as a relay node provides an interface through to the CU 40 via the other DU 42 and therefore provides a forward and a reverse channel to and from the CU 40 as a logical F1 interface.

Embodiments of the present technique have been described with reference with a 5G network architecture. However, the embodiments of the present technique find application equally with other network architectures and systems standards and is not limited to 5G. Furthermore, network architecture may change from the embodiments presented above.

Those skilled in the art would appreciate that such infrastructure equipment and/or communications devices as herein defined may be further defined in accordance with the various arrangements and embodiments discussed in the preceding paragraphs. It would be further appreciated by those skilled in the art that such infrastructure equipment and communications devices as herein defined and described may form part of communications systems other than those defined by the present invention.

The following numbered paragraphs provide further example aspects and features of the present technique:

Paragraph 1. A wireless communications device for acting as a remote node of a wireless communications network, the wireless communications device comprising transmitter circuitry for transmitting radio signals via wireless access interface of a radio access network part of the wireless communications network, receiver circuitry for receiving radio signals transmitted via the wireless access interface of the radio access network part, and controller circuitry configured to select, when the wireless communications device is in an idle mode in which it has not established a connection to the wireless communications network, an infrastructure equipment forming part of the radio access network of the wireless communications network to provide a network interface with a core network part of the wireless communications network via the selected infrastructure equipment, which acts as a relay node, to control the transmitter circuitry to transmit radio signals via a network interface reverse channel to the selected infrastructure equipment acting as the relay node, the radio signals representing uplink data received from one or more communications devices for transmission to the core network, when the wireless communications device is operating as the remote node, and to control the receiver circuitry to receive radio signals via a network interface forward channel from the selected infrastructure equipment acting as the relay node, the radio signals representing downlink data for transmission to one or more communications devices received from the core network part of the wireless communications network, when the wireless communications device is operating as the remote node.

Paragraph 2. A wireless communications device according to paragraph 1, wherein when in a connected mode in which it has established a connection to the wireless communications network, the receiver circuitry is configured to receive a first version of system information transmitted from the infrastructure equipment via the wireless access interface and to receive a second version of the system information via the network interface forward channel, and to configure the transmitter circuitry or the receiver circuitry to adapt the wireless access interface in accordance with the second version of the system information and to ignore the first version of the system information.

Paragraph 3. A wireless communications device according to paragraph 1, wherein the receiver circuitry is configured to receive a first version of broadcast information transmitted from the selected infrastructure equipment via the wireless access interface and to receive a second version of the broadcast information via the network interface forward channel from the selected infrastructure equipment, and to configure the transmitter circuitry to transmit signals based on the second version of the broadcast information to one or more communications devices.

Paragraph 4. A wireless communications device according to paragraph 3, wherein the broadcast information is an emergency or warning broadcast information or service related.

Paragraph 5. A wireless communications device according to paragraph 1, wherein, when in the idle mode, the receiver circuitry is configured to receive on demand system information in response to transmitting a request for the on-demand system information to the selected infrastructure equipment providing the network interface to the core network.

Paragraph 6. A wireless communications device according to paragraph 1, wherein the controller circuitry is configured when in the idle mode to select the infrastructure equipment from a plurality of infrastructure equipment to provide the network interface in response to receiving, using the receiver circuitry, from the selected infrastructure equipment an indication that the selected infrastructure equipment can form the network interface for the wireless communications device, or if the indication is not received selecting a different one of the plurality of infrastructure equipment to form the network interface.

Paragraph 7. A wireless communications device according to paragraph 6, wherein the controller circuitry is configured to select the infrastructure equipment even if the receiver circuitry receives an indication in the system information that the selected infrastructure equipment is reserved for operator use.

Paragraph 8. A wireless communications device according to paragraph 1, wherein the controller circuitry is configured when in the idle mode to select the infrastructure equipment from a plurality of infrastructure equipment to provide the network interface in response to receiving using the receiver circuitry from one or more of the plurality of infrastructure equipment system information which includes an indication as to whether or not the infrastructure equipment is a barred cell, the infrastructure equipment being selected based on an indication that selected infrastructure equipment is not one which is barred from forming the network interface to act as a relay node for the wireless communications device acting as a remote node.

Paragraph 9. A wireless communications device according to paragraph 1, wherein the controller circuitry is configured when in the idle mode to select the infrastructure equipment from a plurality of infrastructure equipment to provide the network interface in response to receiving, using the receiver circuitry, from one or more of the infrastructure equipment an access class barring indication as to whether the infrastructure equipment cannot be used to form the network interface for the wireless communications device, the infrastructure equipment being selected based on an indication that the selected infrastructure equipment can form the network interface and act as a relay node for the wireless communications device acting as a remote node.

Paragraph 10. A wireless communications device according to paragraph 1, wherein the controller circuitry is configured when in the idle mode to select the infrastructure equipment from a plurality of infrastructure equipment to provide the network interface in response to receiving, using the receiver circuitry from one or more of the plurality of infrastructure equipment, an hop indication of whether each of the infrastructure equipment can form a network interface for the infrastructure equipment when the infrastructure itself has one or more secondary infrastructure equipment providing a network interface to the core network and if so a limit on a maximum number of secondary infrastructure equipment and the infrastructure equipment for that infrastructure equipment to be used to form the network interface to core network, and to select the infrastructure equipment based on the received hop indication and the maximum number of the secondary infrastructure equipment and the infrastructure equipment.

Paragraph 11. A wireless communications device according to paragraph 1, wherein the controller circuitry is configured when in the idle mode to select the infrastructure equipment from the plurality of infrastructure equipment to provide the network interface in response to receiving, using the receiver circuitry, from one or more of the infrastructure equipment, an indication that the infrastructure equipment is configured with a bandwidth part reserved for providing a dedicated resource to form the wireless network interface from the infrastructure equipment acting as a relay node to the wireless communications device acting as a remote node, the infrastructure equipment being selected if the indication indicates that it supports a reserved bandwidth part.

Paragraph 12. A wireless communications device according to paragraph 1, wherein the controller circuitry is configured when in a connected mode to select the infrastructure equipment from the plurality of infrastructure equipment to provide the network interface in response to receiving, using the receiver circuitry, from one or more of the infrastructure equipment, an indication that the infrastructure equipment is configured with a bandwidth part reserved for providing a dedicated resource to form the wireless network interface from the infrastructure equipment acting as a relay node to the wireless communications device acting as a remote node, the infrastructure equipment being selected if the indication indicates that it supports a reserved bandwidth part in which to transmit system information separately from system information transmitted to communications devices served by the selected infrastructure equipment.

Paragraph 13. A wireless communications device according to any of paragraphs 1 to 11, wherein the network interface forward channel and the network interface reverse channel form the wireless network interface.

Paragraph 14. A method of operating a wireless communications device to act as a remote node of a wireless access network, the method comprising
  selecting, when the wireless communications device is in an idle mode in which it has not established a connection to the wireless communications network, an infrastructure equipment forming part of the radio access network of the wireless communications network to provide a network interface with a core network part of the wireless communications network via the selected infrastructure equipment,
  controlling transmitter circuitry to transmit radio signals via a network interface reverse channel to the selected infrastructure equipment, the radio signals representing uplink data received from one or more communications devices for transmission to the core network when the wireless communications device is operating as the remote node, and
  controlling receiver circuitry to receive radio signals via a network interface forward channel from the selected infrastructure equipment, the radio signals representing downlink data for transmission to one or more communications devices received from the core network part of the wireless communications network when the wireless communications device is operating as the remote node.

Paragraph 15. A method according to paragraph 14, comprising, when in a connected mode in which it has established a connection to the wireless communications network, receiving a first version of system information transmitted from the infrastructure equipment via the wireless access interface and to receive a second version of the system information via the network interface forward channel, and configuring the transmitter circuitry or the receiver circuitry to adapt the wireless access interface in accordance with the second version of the system information and ignoring the first version of the system information.

Paragraph 16. A method according to paragraph 14, comprising receiving a first version of broadcast information transmitted from the selected infrastructure equipment via the wireless access interface and receiving a second version of the broadcast information via the network interface forward channel from the selected infrastructure equipment, and configuring the transmitter circuitry to transmit signals based on the second version of the broadcast information to one or more communications devices.

Paragraph 17. A method according to paragraph 16, wherein the broadcast information is an emergency or warning broadcast information or service related.

Paragraph 18. A method according to paragraph 14, comprising, when in the idle mode, receiving on demand system information in response to transmitting a request for the on-demand system information to the selected infrastructure equipment providing the network interface to the core network.

Paragraph 19. A method according to paragraph 14, wherein the selecting the infrastructure equipment from a plurality of infrastructure equipment to provide the network interface, comprises, when in the idle mode select the infrastructure equipment from the plurality of infrastructure equipment in response to receiving, from the selected infrastructure equipment, an indication that the selected infrastructure equipment can form the network interface for the wireless communications device, or if the indication is not received selecting a different one of the plurality of infrastructure equipment to form the network interface.

Paragraph 20. A method according to paragraph 19, wherein the selecting the infrastructure equipment includes selecting the infrastructure equipment even if the receiver circuitry receives an indication in the system information that the selected infrastructure equipment is reserved for operator use.

Paragraph 21. A method according to paragraph 14, wherein the selecting the infrastructure equipment from a plurality of infrastructure equipment to provide the network interface comprises, when in the idle mode, selecting the infrastructure equipment from a plurality of infrastructure equipment to provide the network interface in response to receiving from one or more of the plurality of infrastructure equipment system information which includes an indication as to whether or not the infrastructure equipment is barred from acting as a relay node, and selecting the infrastructure equipment based on an indication that selected infrastructure equipment is not one which is barred from forming the network interface to act as a relay node for the wireless communications device acting as a remote node.

Paragraph 22. A method according to paragraph 14, wherein the selecting the infrastructure equipment from a plurality of infrastructure equipment to provide the network interface comprises, when in the idle mode, selecting the infrastructure equipment from the plurality of infrastructure equipment to provide the network interface in response to receiving from one or more of the infrastructure equipment an access class barring indication as to whether the infrastructure equipment cannot be used to form the network interface for the wireless communications device, the infrastructure equipment being selected based on an indication that selected infrastructure equipment can form the network interface acting as a relay node for the wireless communications device acting as a remote node.

Paragraph 23. A method according to paragraph 14, wherein the selecting the infrastructure equipment from a plurality of infrastructure equipment to provide the network interface comprises, when in the idle mode, selecting the infrastructure equipment from the plurality of infrastructure equipment to provide the network interface in response to receiving from one or more of the plurality of infrastructure equipment a hop indication of whether the infrastructure equipment can form a network interface for the infrastructure equipment when the infrastructure itself has one or more secondary infrastructure equipment providing a network interface to the core network and if so a limit on a maximum number of secondary infrastructure equipment and the infrastructure equipment for that infrastructure equipment to be used to form the network interface to core network, and to select the infrastructure equipment based on the received hop indication and the maximum number of the secondary infrastructure equipment.

Paragraph 24. A method according to paragraph 14, wherein the selecting the infrastructure equipment from a plurality of infrastructure equipment to provide the network interface comprises, when in the idle mode, selecting the infrastructure equipment from the plurality of infrastructure equipment to provide the network interface in response to receiving, from one or more of the infrastructure equipment, an indication that the infrastructure equipment is configured with a bandwidth part reserved for providing a dedicated resource to form the wireless network interface from the infrastructure equipment acting as a relay node for the wireless communications device acting as a remote node, the infrastructure equipment being selected if the indication indicates that it supports a reserved bandwidth part.

Paragraph 25. A method according to paragraph 14, wherein the selecting the infrastructure equipment from a plurality of infrastructure equipment to provide the network interface comprises, when in a connected mode, selecting the infrastructure equipment from the plurality of infrastructure equipment to provide the network interface in response to receiving from one or more of the infrastructure equipment, an indication that the infrastructure equipment is configured with a bandwidth part reserved for providing a dedicated resource to form the wireless network interface from the infrastructure equipment acting as a relay node to the wireless communications device acting as a remote node, the infrastructure equipment being selected if the indication indicates that it supports a reserved bandwidth part in which to transmit system information separately from system information transmitted to communications devices served by the selected infrastructure equipment.

Paragraph 26. A method according to any of paragraphs 1 to 11, wherein the network interface forward channel and the network interface reverse channel form the wireless network interface.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognise that various features of the described embodiments may be combined in any manner suitable to implement the technique.

REFERENCES

RANP #75 in March 2017

What is claimed is:

1. A wireless communications device for acting as a remote node of a wireless communications network, the wireless communications device comprising
    transmitter circuitry for transmitting radio signals via wireless access interface of a radio access network part of the wireless communications network,
    receiver circuitry for receiving radio signals transmitted via the wireless access interface of the radio access network part, and
    controller circuitry configured
    to select, when the wireless communications device is in an idle mode in which it has not established a connection to the wireless communications network, an infrastructure equipment forming part of the radio access network of the wireless communications network to provide a network interface with a core network part of the wireless communications network via the selected infrastructure equipment, which acts as a relay node,
    to control the transmitter circuitry to transmit radio signals via a network interface reverse channel to the selected infrastructure equipment acting as the relay node, the radio signals representing uplink data received from one or more communications devices for transmission to the core network, when the wireless communications device is operating as the remote node, and
    to control the receiver circuitry to receive radio signals via a network interface forward channel from the selected infrastructure equipment acting as the relay node, the radio signals representing downlink data for transmission to one or more communications devices received from the core network part of the wireless communications network, when the wireless communications device is operating as the remote node.

2. A wireless communications device as claimed in claim 1, wherein when in a connected mode in which it has established a connection to the wireless communications network, the receiver circuitry is configured to receive a first version of system information transmitted from the infrastructure equipment via the wireless access interface and to receive a second version of the system information via the network interface forward channel, and to configure the transmitter circuitry or the receiver circuitry to adapt the wireless access interface in accordance with the second version of the system information and to ignore the first version of the system information.

3. A wireless communications device as claimed in claim 1, wherein the receiver circuitry is configured to receive a first version of broadcast information transmitted from the selected infrastructure equipment via the wireless access interface and to receive a second version of the broadcast information via the network interface forward channel from the selected infrastructure equipment, and to configure the transmitter circuitry to transmit signals based on the second version of the broadcast information to one or more communications devices.

4. A wireless communications device as claimed in claim 3, wherein the broadcast information is an emergency or warning broadcast information or service related.

5. A wireless communications device as claimed in claim 1, wherein, when in the idle mode, the receiver circuitry is configured to receive on demand system information in response to transmitting a request for the on-demand system information to the selected infrastructure equipment providing the network interface to the core network.

6. A wireless communications device as claimed in claim 1, wherein the controller circuitry is configured when in the idle mode to select the infrastructure equipment from a plurality of infrastructure equipment to provide the network interface in response to receiving, using the receiver circuitry, from the selected infrastructure equipment an indication that the selected infrastructure equipment can form the network interface for the wireless communications device, or if the indication is not received selecting a different one of the plurality of infrastructure equipment to form the network interface.

7. A wireless communications device as claimed in claim 6, wherein the controller circuitry is configured to select the infrastructure equipment even if the receiver circuitry receives an indication in the system information that the selected infrastructure equipment is reserved for operator use.

8. A wireless communications device as claimed in claim 1, wherein the controller circuitry is configured when in the idle mode to select the infrastructure equipment from a plurality of infrastructure equipment to provide the network interface in response to receiving using the receiver circuitry from one or more of the plurality of infrastructure equipment system information which includes an indication as to whether or not the infrastructure equipment is a barred cell, the infrastructure equipment being selected based on an indication that selected infrastructure equipment is not one which is barred from forming the network interface to act as a relay node for the wireless communications device acting as a remote node.

9. A wireless communications device as claimed in claim 1, wherein the controller circuitry is configured when in the idle mode to select the infrastructure equipment from a plurality of infrastructure equipment to provide the network interface in response to receiving, using the receiver circuitry, from one or more of the infrastructure equipment an access class barring indication as to whether the infrastructure equipment cannot be used to form the network interface for the wireless communications device, the infrastructure equipment being selected based on an indication that the selected infrastructure equipment can form the network interface and act as a relay node for the wireless communications device acting as a remote node.

10. A wireless communications device as claimed in claim 1, wherein the controller circuitry is configured when in the idle mode to select the infrastructure equipment from a plurality of infrastructure equipment to provide the network interface in response to receiving, using the receiver circuitry from one or more of the plurality of infrastructure equipment, an hop indication of whether each of the infrastructure equipment can form a network interface for the infrastructure equipment when the infrastructure itself has one or more secondary infrastructure equipment providing a network interface to the core network and if so a limit on a maximum number of secondary infrastructure equipment and the infrastructure equipment for that infrastructure equipment to be used to form the network interface to core network, and to select the infrastructure equipment based on the received hop indication and the maximum number of the secondary infrastructure equipment and the infrastructure equipment.

11. A wireless communications device as claimed in claim 1, wherein the controller circuitry is configured when in the idle mode to select the infrastructure equipment from the plurality of infrastructure equipment to provide the network interface in response to receiving, using the receiver circuitry, from one or more of the infrastructure equipment, an indication that the infrastructure equipment is configured with a bandwidth part reserved for providing a dedicated resource to form the wireless network interface from the infrastructure equipment acting as a relay node to the wireless communications device acting as a remote node, the infrastructure equipment being selected if the indication indicates that it supports a reserved bandwidth part.

12. A wireless communications device as claimed in claim 1, wherein the controller circuitry is configured when in a connected mode to select the infrastructure equipment from the plurality of infrastructure equipment to provide the network interface in response to receiving, using the receiver circuitry, from one or more of the infrastructure equipment, an indication that the infrastructure equipment is configured with a bandwidth part reserved for providing a dedicated resource to form the wireless network interface from the infrastructure equipment acting as a relay node to the wireless communications device acting as a remote node, the infrastructure equipment being selected if the indication indicates that it supports a reserved bandwidth part in which to transmit system information separately from system information transmitted to communications devices served by the selected infrastructure equipment.

13. A method of operating a wireless communications device to act as a remote node of a wireless access network, the method comprising selecting, when the wireless communications device is in an idle mode in which it has not established a connection to the wireless communications network, an infrastructure equipment forming part of the radio access network of the wireless communications network to provide a network interface with a core network part of the wireless communications network via the selected infrastructure equipment, controlling transmitter circuitry to transmit radio signals via a network interface reverse channel to the selected infrastructure equipment, the radio signals representing uplink data received from one or more communications devices for transmission to the core network when the wireless communications device is operating as the remote node, and controlling receiver circuitry to receive radio signals via a network interface forward channel from the selected infrastructure equipment, the radio signals representing downlink data for transmission to one or more communications devices received from the core network part of the wireless communications network when the wireless communications device is operating as the remote node.

14. A method as claimed in claim 13, comprising, when in a connected mode in which it has established a connection to the wireless communications network, receiving a first version of system information transmitted from the infrastructure equipment via the wireless access interface and to receive a second version of the system information via the network interface forward channel, and configuring the transmitter circuitry or the receiver circuitry to adapt the wireless access interface in accordance with the second version of the system information and ignoring the first version of the system information.

15. A method as claimed in claim 13, comprising receiving a first version of broadcast information transmitted from the selected infrastructure equipment via the wireless access interface and receiving a second version of the broadcast information via the network interface forward channel from the selected infrastructure equipment, and configuring the transmitter circuitry to transmit signals based on the second version of the broadcast information to one or more communications devices.

16. A method as claimed in claim 15, wherein the broadcast information is an emergency or warning broadcast information or service related.

17. A method as claimed in claim 13, comprising, when in the idle mode, receiving on demand system information in response to transmitting a request for the on-demand system information to the selected infrastructure equipment providing the network interface to the core network.

18. A method as claimed in claim 13, wherein the selecting the infrastructure equipment from a plurality of infrastructure equipment to provide the network interface, comprises, when in the idle mode select the infrastructure equipment from the plurality of infrastructure equipment in response to receiving, from the selected infrastructure equipment, an indication that the selected infrastructure equipment can form the network interface for the wireless communications device, or if the indication is not received selecting a different one of the plurality of infrastructure equipment to form the network interface.

19. A method as claimed in claim 13, wherein the selecting the infrastructure equipment from a plurality of infrastructure equipment to provide the network interface comprises, when in the idle mode, selecting the infrastructure equipment from a plurality of infrastructure equipment to provide the network interface in response to receiving from one or more of the plurality of infrastructure equipment system information which includes an indication as to whether or not the infrastructure equipment is barred from acting as a relay node, and selecting the infrastructure equipment based on an indication that selected infrastructure equipment is not one which is barred from forming the network interface to act as a relay node for the wireless communications device acting as a remote node.

20. A method as claimed in claim 13, wherein the selecting the infrastructure equipment from a plurality of infrastructure equipment to provide the network interface comprises, when in the idle mode, selecting the infrastructure equipment from the plurality of infrastructure equipment to provide the network interface in response to receiving from one or more of the infrastructure equipment an access class barring indication as to whether the infrastructure equipment cannot be used to form the network interface for the wireless communications device, the infrastructure equipment being selected based on an indication that selected infrastructure equipment can form the network interface acting as a relay node for the wireless communications device acting as a remote node.

* * * * *